United States Patent Office 3,499,848
Patented Mar. 10, 1970

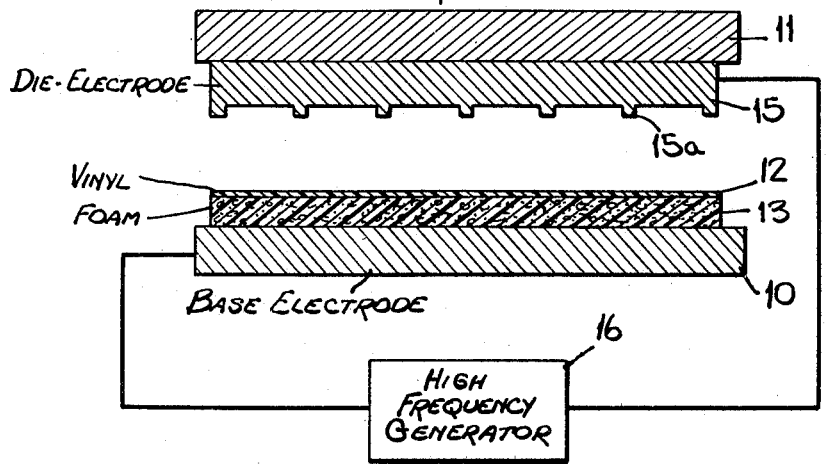
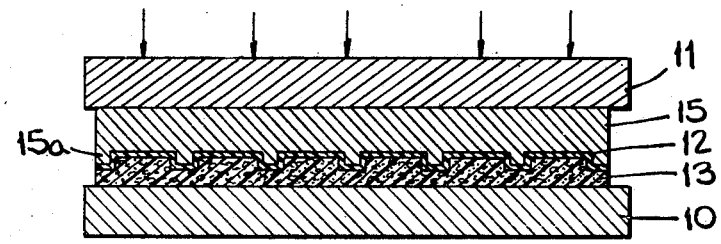
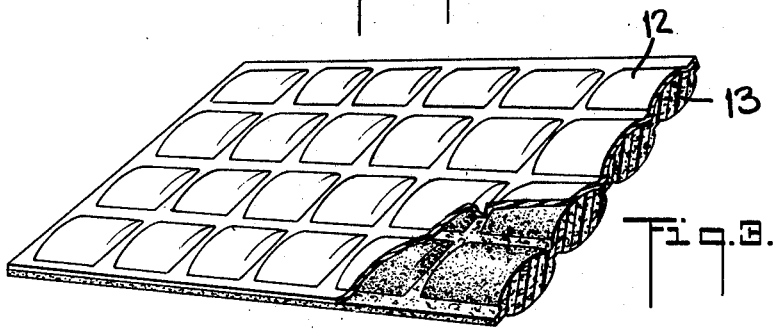
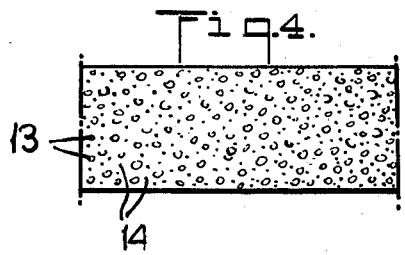

3,499,848
DIELECTRICALLY-MODIFIED POLYURETHANE FOAM
Morey Weisman, 147—23 Charter Road,
Jamaica, N.Y. 11435
Continuation-in-part of application Ser. No. 520,528,
Jan. 13, 1966. This application May 31, 1968, Ser.
No. 733,563
Int. Cl. C08g 41/00
U.S. Cl. 260—2.5                5 Claims

ABSTRACT OF THE DISCLOSURE

A dielectrically-modified, flexible foam formed by a homogeneous polyurethane material of elastic consistency having uniformly dispersed therein colloidal particles which are electrically conductive or semi-conductive and free of agglomerates. The particles are in a concentration causing the modified form material to soften when subjected to a high-frequency field at a power level which is markedly lower than the amount of power necessary in the absence of these particles.

RELATED APPLICATION

This application is a continuation-in-part of my copending application Ser. No. 520,528, filed Jan. 13, 1966, of the same title, now abandoned.

This invention relates generally to flexible polyurethane foams capable of being embossed, heat-sealed or otherwise processed by dielectric heating techniques, and more particularly to a method for making a dielectrically-modified polyurethane foam, and to improved products fabricated therefrom.

In dielectric heating or electronic welding techniques, the material to be processed is pressed between two electrodes across which a high-frequency voltage, in the frequency range of 2 to 200 megacycles, is applied to generate heat within the material. For dielectric embossing, the surface of one of the electrodes is contoured with the design to be imparted to the material.

Polyvinyl chloride is the most widely used plastic in dielectric heat-sealing and electronic embossing. When subjected to a high-frequency field, the electrically-charged molecules in the material attempt to change position in response to the rapidly changing current. Heat is generated in the plastic because of the internal friction caused by the molecules rubbing against each other at tremendous speed. The heat produced internally by the agitated molecules during passage of the current is sufficient to reduce the plastic to a near-liquid or softened state that can result in a weld when pressure from a die is applied. Heat-sealing or welding depends upon three factors: a high-frequency generator of the correct power output for the job at hand; a closely coupled press with a well-made die and the dielectric loss characteristics of the plastic.

This electronic process may be used to manufacture decoratively embossed automotive upholstery in which a trim material, such as vinyl, is placed over a flexible foam plastic pad having a fabric or fiberboard backing. Upon operation of the dielectric heating press, an embossed pattern is produced in the laminated article, in which the trim material is fused to the backing through the foam plastic pad, the plastic in the pad having been melted and cured along the embossing lines.

The flexible foam pad in the embossed article provides a cushioning and shock-absorbing effect, and it is possible by this technique to produce seat covers, floor mats and wall panels of various kinds. and many other cushioned and embossed products having an attractive trim. In the commercial manufacture of articles of the type wherein the heat-seal seam joining the laminations also completely defines the contour of the article, it is possible to so construct the shaped electrode as to form along the heat-seal lines a tear line permitting ready stripping of the waste material from the completed article. This does away with the need for a subsequent cutting operation and leaves a well defined edge on the article. Tear sealing is, however only feasible with unsupported thermoplastic filament sheeting.

Heretofore, products of the above-described type have been made by heat-sealing a sheet or pad of vinyl foam to a sheet of unsupported vinyl film, the film serving as the facing or trim material. It will be noted that such combinations of vinyl film and vinyl foam material have similar chemical and dielectric characteristics. However, it has not hitherto been feasible commercially, using conventional dielectric heating equipment, to laminate together such dissimilar materials as a vinyl film with a polymer foam of flexible character, such as polyurethane foam. Among the advantages of polyurethane foam over vinyl and other forms of flexible foam, are that polyurethane foam has superior thermal and acoustical insulating properties and a more uniform cell structure. Moreover, not only is polyurethane foam much lighter than vinyl foam, which is an important factor in handling and transportation costs, but it is a much more economical material.

The reason why it has been difficult to laminate together dissimilar materials by dielectric heating, is that the heat actually developed in the material, when subjected to a high-frequency field, depends not only on the amplitude and frequency of the applied voltage, but also on the dielectric constant and power or loss factor of the material, as well as the dielectric strength thereof.

In attempting to dielectrically emboss a combination of vinyl film and ordinary polyurethane foam with conventional techniques, the disparate characteristics of these materials result in burning of the vinyl when the voltages are adjusted sufficiently to heat the foam. On the other hand, when the voltage is appropriate to the film, it is insufficient to heat the foam. The softening point of polyvinyl chloride is about 200° F., whereas that of polyurethane foam is in the order of 400° F. to 500° F. Hence, in adjusting a dielectric heater to vinyl, it will be maladjusted to the foam, and vice versa.

Accordingly, it is the principal object of the invention to provide a dielectrically-modified polyurethane foam whose dielectric properties render the material suitable for sealing, welding, embossing, lamination to dissimilar materials and to a variety of other applications using dielectric heating techniques at power levels markedly lower than that ordinarily necessary for unmodified polyurethane foam.

A significant feature of the invention resides in the fact that it renders possible the production of articles having a flexible polyurethane layer by existing dielectric heating and die equipment, and thereby satisfies market requirements for a simple, inexpensive and rapid method for embossing or texturizing polyurethane foam products.

Briefly stated, in accordance with the present invention, a flexible foam material is formed by a homogeneous polyurethane material of elastic consistency having uniformly dispersed therein colloidal particles of an electrically conductive or semi-conductive substance which is free of agglomerates, the particles being in a concentration of about 3% by weight, whereby the resultant modified polyurethane material can be softened when subjected to a high-frequency field at a power level no greater than is necessary to soften an unmodified plastic material having a softening point of about 200° F. to 300° F.

While it has been known to use carbon black as a filler for foam material, as in the patent to Buist et al. 2,424,885 and in the patent to Pace 2,740,743, the nature of the carbon black and the concentration thereof as disclosed in these patents is not such as to dielectrically modify the material in the manner of the present invention whereby the modified foam can thereafter be processed by high-frequency sealing or embossing techniques.

For a better understanding of the invention, as well as other objects and further features thereof, reference is made to the following detailed description to be read in conjunction with the accompanying drawing, wherein:

FIG. 1 shows a trim assembly positioned in a dielectric press preparatory to embossing, the view being in section and being generally schematic;

FIG. 2 is similar to FIG. 1, but as the assembly appears in the dielectric embossing operation;

FIG. 3 shows in perspective the embossed article resulting from the process; and FIG. 4 is a section taken through a piece of cellular polyurethane flexible foam having additional particles uniformly dispersed therein.

Referring now to FIG. 1, there is shown a dielectric heating press of standard design, including a base platen 10 and a movable head or upper platen 11, the press being arranged to shift the upper platen downwardly. Positioned within the press is a laminated trim assembly constituted by a sheet of trim material 12 positioned on a layer or pad 13 of flexible foam plastic material. The trim may be of unsupported vinyl or a vinyl-coated material, while the pad is of dielectrically-modified polyurethane foam in accordance with the invention. Among the dielectric heating units suitable for carrying out the invention are "Thermatron" devices manufactured by Wilcox & Gibbs Sewing Machine Company of New York, and the "Sealomatic" electronic heat-sealing machine produced by Sealomatic Electronics Corporation, also of New York.

By "trim assembly" as this term is used herein, is meant any combination of a layer of polyurethane foam with a decorative top layer of another material, to which may be added a base layer of substrate. For example, the top layer, referred to as the trim layer, may be formed of synthetic or natural fabrics such as those of cotton, wool, rayon, or nylon, which have been coated or sprayed with a suitable polyvinyl chloride latex emulsion. Alternatively, the top layer may consist of a fabric sheet having a separate underlayer of vinyl film which when subjected to dielectric heating acts to bond the fabric sheet to the polyurethane foam. The base layer, if one is included, may be of the same flexible material as the top layer, or it may be another rigid or flexible material.

The basic processes for making homogeneous, polyurethane foam of elastic consistency are disclosed in Patent 2,764,565, issued Sept. 25, 1956. Most polyurethane flexible foam is based on diethylene glycoladipic acid polyesters. In accordance with the present invention, intermingled with the liquid foaming mixture are impurities in the form of fine, resistive or electrically semi-conductive particles 14, such as graphite, carbon, iron oxide or metallic powders which do not react with the foaming mixture or affect the foaming characteristics thereof but are suspended therein, whereby when the mixture is laid down, foamed and cured, the particles are uniformly dispersed throughout the body of flexible foam, the individual particles being electrically insulated from each other.

It is important that the additive particles be in fine powder form of colloidal size, and that they be uniformly dispersed throughout the body of the foam, otherwise the existence of clusters of particles within the foam may give rise to deleterious arcing when the foam is subjected to a high frequency field. To this end the additives are introduced into a mixing or reaction zone in the foam-making system and are thoroughly intermingled with the urethane constituents by suitable agitators so that the resistive particles are effectively homogenized in the liquid foaming mixture.

In a preferred embodiment of the invention, colloidal carbon black powder is uniformly dispersed throughout the body of the polyurethane foam of the ester or ether type, the amount of the carbon black additive relative to the foam being such as to markedly reduce the amount of high-frequency power necessary to effect dielectric heating of the material. The reason for such reduction is that eddy-current losses produced by the high-frequency field in the electrically conductive or resistive particles, produce heat therein which in combination with the heat resulting from dielectric losses, is sufficient to effect softening of the material. However, the powder size and concentration of additive must be such as not to interfere with the cell-forming and foaming characteristics of the polyurethane.

Among the commercial types of carbon black are furnace black, lamp-black, acetylene black, impingement or channel black, and thermal black. Regardless of the choice of carbon black, it is essential (a) that the particles be in colloidal sizes, i.e., in the millimicron range, (b) that the particles be uniformly dispersed and free of agglomerates, and (c) that the conductivity and concentration thereof be such as markedly to reduce the high-frequency power level requirements for electronically processing the material, but not to an extent which is excessive, for otherwise the modified polyurethane will melt at power levels which are significantly lower than is required for polyvinyl chloride and other dissimilar plastic material having a softening point of about 200° F.

As pointed out previously, unmodified polyurethane foam has a softening point which, depending on the nature of the polyurethane, lies in the range of about 400° F. to 500° F. Many other plastic materials such as polyvinyl chloride, have a softening point lying in the range of about 200° F. to 300° F. Hence the type and concentration of the additive must be such as to cause the modified polyurethane foam to soften when the level of high-frequency power is such as otherwise to cause softening of plastic material whose softening point is in the 200° F.–300° F. range.

Carbon black has four properties which affect its conductivity, namely, surface purity, particle size, particle structure, and internal crystal structure. The presence of volatile or oily impurities on the surface can increase the resistivity of colloidal carbon one-hundred fold, hence in certain applications there is a need for heat-treatment in an inert atmosphere to clean the surfaces.

Finer particles have a greater surface area, hence greater conductivity. High-structure carbons are better conductors, for they provide conductivity bridges through the reticulate chain structure. Internal crystal structure also affects the internal resistance of the particles, the more graphitic type of crystal structure providing the highest level of conductivity.

In this connection, reference is made to the technical service report published by Columbian Carbon Company, entitled "Carbon Black in Conductive Applications." Thus carbon blacks having the combination of fine particle size, a normal to high structure index, and clean surfaces, provide moderately high conductivity. In this category is Columbian's "Conductex SC."

The degree of eddy-current losses for any resistant material in which current is induced by a high-frequency field is a direct function of particle size as well as flux density and frequency. By the use of colloidal resistive particles uniformly dispersed in the foam, the eddy-current losses are not so great as to cause overheating and premature melting of the polyurethane foam. Also, by avoiding agglomerates, so that the minute particles are all effectively insulated from each other in the foam, deleterious internal arcing is avoided. In order to break up agglomerates, the carbon particles are preferably mixed into a glycol and then dispersed in the resin formulation.

It has been found that when the concentration of the carbon black particles is about 3% by weight relative to the polyurethane foam, the resultant product can be processed by dielectric heating techniques and caused to soften at power levels no higher than that required for ordinary plastic materials such as polyvinyl chloride whose softening point is in the range of about 200° F. to 300° F. It is important that the particles be of colloidal size, for eddy-current losses produced in particles of larger size are so great as to burn the polyurethane foam at ordinary high-frequency power levels.

Example I

In the following example, various amounts of carbon black additive were dispersed in a polyurethane formulation:

Materials in urethane foam

| formulation: | Parts by weight |
|---|---|
| Glycerol polyoxypropylene triol 3000 M.W. (a standard commercial market resin) | 100 |
| Water | 3.70 |
| Triethylene diamine (Dabco 33LV) | 0.3 |
| Oil (silicone surfactant DC-190) | 1.2 |
| Stannous octoate catalyst (T-9 catalyst) | 0.75 |
| Methylene chloride | 7.0 |
| Amine | 0.37 |
| TDI foaming agent (80/20 2,4/2,6 isomers) (105 index) | 46.05 |
| Total | 159.37 |

Carbon black additive (Conductex SC as made by Columbian Carbon Co.—Average particle size, 17 millimicrons)

The carbon black was employed at the following levels:

| Foam sample number: | Carbon percentage by weight, based on 159.37 p.b.w. |
|---|---|
| #1 | 3/8 |
| #2 | 3/4 |
| #3 | 1½ |
| #4 | 3 |
| #5 | 6 |
| #6 | 9 |

It was found that when the concentration of carbon was in excess of 3% by weight (sample 5–6%; sample 6–9%), internal foam splitting occurred and the cellular structure collapsed, so that the resultant product was not commercially acceptable. On the other hand, for concentrations of less than 3% (sample 1–3/8%; sample 2–3/4%; sample 3–1½%), the modified dielectric characteristics were not such as to markedly reduce the high-frequency power level requirements. But with about a 3% by weight concentration, foam-splitting was avoided and the high-frequency power level requirements to soften the product were then such that no greater power was required than was necessary to soften polyvinyl chloride having a softening point of about 200° F.

Examples II and III

Similar results were obtained with the same resin formulation using other types of carbon black.

Type of addtive—Furnace black
Particle size—Approx. 17 millimicron diameter (arithmetic means)
Surface area—Approx. 200 square meters per gram
Structure—High
Electrical conductivity—High
Dispersion—Uniformity and high degree of wide dispersion
Carbon content—Approx. 3% parts by weight or 4.69 on resin
Type of additive—Impingement (channel) black
Particle size—Approx. 16 millimicrons
Surface area—Approx. 275 sq. meters per gram
Structure—Normal
Dispersion—Uniformity and high degree of wide dispersion
Content—Approx. 3% parts by weight The trim assembly is positioned on the flat paten 10. Attached to the upper platen 11 is an embossing die 15 of electrically conductive material such as brass, provided with embossing ribs 15a which are set on edge and are thus adapted to impart the desired pattern or design to the trim assembly upon closing of the press and the application of heat and pressure. In the event of tear sealing, the edges of the die are properly chamfered to produce tear lines. Obviously, almost any desired die configuration may be used.

Dielectric heating is effected in the usual manner by a high-frequency generator 16 having a power rating of about 2 to 50 kilowatts or higher in some instances, whose output is connected between the die 15 and the base electrode or platen 10, whereby a high-frequency field is established therebetween which penetrates the trim assembly.

In operation, the die is brought down onto the trim assembly, as shown in FIG. 2, to engage the assembly, the portions under the rib being compressed. The pressure is in the order of 80 to 200 pounds per square inch, the foam under the ribs being sufficiently compressed to flatten the cells thereof. The amount of pressure used depends on the thickness of the assembly and the physical characteristics of the materials therein.

After the press is closed, the high-frequency voltage is applied, preferably in the order of 2000 volts in a frequency range of 2 to 200 megacycles, preferably between 18 to 30 megacycles. As the electric field passes through the vinyl and foam, the dielectric losses produced therein result in a heating action whereby the foam and vinyl under pressure are caused simultaneously to soften and fuse together, the voltage thereafter being cut off to allow cooling and solidification before the pressure is removed, whereby the embossed design is set into the assembly.

The resultant embossed structure is shown in FIG. 3, where it will be seen that the trim sheet and the foam pad thereunder are embossed and bonded together along the embossing lines. In practice, a backing sheet may be used below the flexible foam pad, the sheet being of a flexible material, such as woven cotton or fiberglass, or semi-rigid, such as fiberboard coated with vinyl. Similarly, as pointed out above, the trim sheet may, instead of vinyl, be composed of a vinyl-covered flexible fabric or film of other material.

The significant feature of the invention as shown in FIG. 4 resides in the introduction of a lossy powder 14 or impurity uniformly dispersed throughout the flexible polyurethane foam matrix 13, which impurity effectively alters the power factors or other characteristics of the modified foam so that it more closely matches that of the vinyl trim or other material used in the trim or substrate. It is to be understood that the dielectrically modified foam not only lends itself to lamination with dissimilar materials, but it is also more readily embossed by dielectric heating.

There are a great variety of end uses for dielectrically modified polyurethane foam products produced in the manner described above. These uses appear in the automotive industry, in upholstering and furniture manufacture, in handbags and luggage, packaging, etc. The polyurethane foam not only provides superior cushioning, shock-absorbing and insulating qualities than vinyl foam, but when its surface is exposed, it affords a high degree of drag or skid resistance. Moreover, unlike vinyl foams, polyurethane foam does not stiffen to nearly as great an extent at low ambient temperatures. Another important use of foam products made in accordance with the invention lies in the acoustic field where the sound reduction properties of three-dimensional texturized or embossed polyurethane structures are highly useful.

Inasmuch as the dielectrically-modified foam may now be processed using standard dielectric heating equipment, it is also possible to laminate together two or more layers of the dielectrically-modified foam. In this way, relatively thick products, such as pillows, can be made by dielectrically heat-sealing together several layers of the polyurethane foam, using conventional dielectric heating voltages and frequencies.

The invention also is applicable to rigid and semi-rigid polyurethane foams, for by modifying the dielectric properties thereof in the manner described herein with respect to flexible foam, it becomes possible to electronically process such materials.

Instead of using conductive or resistive particles to modify the dielectric heat-sealing characteristics of polyurethane foam, one may accomplish similar results by permeating the cells of the polyurethane foam with a polyvinyl chloride additive.

This may be accomplished by unwinding a web of polyether polyurethane having an open cell structure, from a roll thereof, the web being then conducted through a roller coating device which picks up a solution or dispersion of polyvinyl chloride from a bath and applies it to the surface of the web. In order to cause the additive to permeate the web, the roller coating system includes a squeeze roll which presses the wet web to cause the solution to be absorbed and dispersed therein. The wet web is then conveyed through a fusing oven, after which the fused polyvinyl-polyurethane material is cooled and rewound. The resultant product, when subjected to high-frequency power, will soften at power levels not much higher than that required to effect softening of vinyl material.

Thus by the invention, two or more materials which are dielectric in nature but which differ in their properties to an extent that they are incompatible to the point that they will not fuse and join together when simultaneously subjected to a high-frequency field, can be rendered effectively compatible in this context. By uniformly dispersing an additive of the type indicated herein and in the proper concentration, the dissimilar materials can be dielectrically welded.

What I claim is:
1. A dielectrically-modified foam plastic product capable of being electronically processed by interposing the product between electrodes connected to a source of high-frequency power, said product comprising:
  (A) a homogeneous polyurethane resin body having a cellular structure and a softening point of between 400° F. to 500° F., and
  (B) colloidal particles of an electrically resistive material selected from the class consisting of carbon black, graphite, and iron oxide, and uniformly dispersed in the cellular structure of said body, said particles being electrically insulated from each other to avoid arcing and giving rise to eddy-current losses when the product is electronically processed to generate heat therein which, together with the heat resulting from dielectric losses, causes said product to soften, the concentration of said particles being about 3% by weight and sufficient to cause said product to soften at a power level capable of softening a dielectric resinous material having a softening point of about 200° F. to 300° F. but incapable of softening a polyurethane resin body lacking said particles.

2. A product as set forth in claim 1, wherein said body is a polyurethane ether foam.

3. A product as set forth in claim 1, wherein said body is a polyurethane ester foam.

4. A product as set forth in claim 1, wherein said product is a flexible foam.

5. A product as set forth in claim 1, wherein the particle size of said carbon black is about 17 millimicrons.

References Cited

UNITED STATES PATENTS 2,740,743    4/1956    Pace.
3,242,108    3/1966    McGary et al.

ROBERT F. BURNETT, Primary Examiner

R. O. LINKER, Jr., Assistant Examiner

U.S. Cl. X.R.
161—119, 160